United States Patent
Kim et al.

(10) Patent No.: US 9,099,732 B2
(45) Date of Patent: Aug. 4, 2015

(54) RECHARGEABLE BATTERY HAVING A FUSE WITH AN INSULATING BLOCKING MEMBER

(75) Inventors: Sung-Bae Kim, Yongin-si (KR); Sang-Won Byun, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 806 days.

(21) Appl. No.: 13/064,798

(22) Filed: Apr. 15, 2011

(65) Prior Publication Data

US 2011/0305928 A1 Dec. 15, 2011

Related U.S. Application Data

(60) Provisional application No. 61/344,213, filed on Jun. 11, 2010.

(51) Int. Cl.
*H01M 10/42* (2006.01)
*H01M 2/34* (2006.01)
*H01M 10/04* (2006.01)

(52) U.S. Cl.
CPC .......... *H01M 2/34* (2013.01); *H01M 10/0431* (2013.01)

(58) Field of Classification Search
CPC .............................. H01M 10/0431; H01M 2/34
USPC ........ 429/61, 7, 149, 176; 337/295, 290, 297, 337/260, 261, 268, 269, 251, 254; 257/529; 439/86
See application file for complete search history.

(56) References Cited

U.S. PATENT DOCUMENTS

| | | | | |
|---|---|---|---|---|
| 5,227,759 A | * | 7/1993 | Hatagishi | 337/260 |
| 5,432,378 A | * | 7/1995 | Whitney et al. | 257/529 |
| 5,644,282 A | * | 7/1997 | Mehta et al. | 429/7 |
| 6,753,104 B2 | | 6/2004 | Kitoh | |
| 7,666,544 B2 | | 2/2010 | Barrault et al. | |
| 8,043,737 B2 | | 10/2011 | Kim | |
| 2003/0008212 A1 | * | 1/2003 | Akashi et al. | 429/231.9 |
| 2004/0092167 A1 | | 5/2004 | Barrault et al. | |
| 2004/0126650 A1 | * | 7/2004 | Kim | 429/61 |
| 2005/0112456 A1 | | 5/2005 | Kozu et al. | |
| 2008/0070067 A1 | | 3/2008 | Jang et al. | |
| 2009/0305126 A1 | | 12/2009 | Choi et al. | |
| 2011/0052949 A1 | | 3/2011 | Byun et al. | |
| 2011/0177387 A1 | | 7/2011 | Byun et al. | |

(Continued)

FOREIGN PATENT DOCUMENTS

| | | |
|---|---|---|
| CN | 1495943 A | 5/2004 |
| CN | 101752601 A | 6/2010 |
| CN | 102005597 A | 4/2011 |

(Continued)

OTHER PUBLICATIONS

Chinese Office Action date Jul. 29, 2013.

(Continued)

*Primary Examiner* — Milton I Cano
*Assistant Examiner* — Ling R Zeng
(74) *Attorney, Agent, or Firm* — Lee & Morse, P.C.

(57) ABSTRACT

A rechargeable battery including an electrode assembly; a terminal; a fuse, the electrode assembly, the terminal, and the fuse being electrically connected to each other; and an insulating blocking member in operative co-operation with the fuse.

19 Claims, 14 Drawing Sheets

(56) References Cited

U.S. PATENT DOCUMENTS

| | | |
|---|---|---|
| 2011/0183193 A1 | 7/2011 | Byun et al. |
| 2011/0244280 A1 | 10/2011 | Byun et al. |

FOREIGN PATENT DOCUMENTS

| | | |
|---|---|---|
| EP | 1901369 A1 | 3/2008 |
| EP | 2357685 A1 | 8/2011 |
| JP | 05-275088 A | 10/1993 |
| JP | 08-050920 A | 2/1996 |
| JP | 08-185850 A | 7/1996 |
| JP | 10-188946 A | 7/1998 |
| JP | 11-307076 A | 11/1999 |
| JP | 2001-202946 A | 7/2001 |
| JP | 2002-216743 A | 8/2002 |
| JP | 2003-178745 A | 6/2003 |
| JP | 2003-308815 A | 10/2003 |
| JP | 2004-521459 A | 7/2004 |
| JP | 2006-012602 A | 1/2006 |
| JP | 2008-177084 A | 7/2008 |
| JP | 2011-154991 A | 8/2011 |
| JP | 2011-210717 A | 10/2011 |
| KR | 10-0870349 B1 | 11/2008 |
| KR | 10-2009-0097599 A | 9/2009 |
| WO | WO 2007/126243 A1 | 11/2007 |

OTHER PUBLICATIONS

Korean Office Action in KR 10-2011-0050510, dated Oct. 8, 2012 (Kim, et al.).
European Search Report in EP 11169286.9-2119 dated Sep. 29, 2011 (Kim, et al.).
European Office Action in EP 11169286.-1360, dated Oct. 7, 2013 (Kim, et al.).
Japanese Office Action in JP 2011-115662, dated Apr. 30, 2013 (Kim, et al.).
Korean Notice of Allowance Dated Mar. 27, 2013.
Chinese Office Action dated Mar. 11, 2014.
Chinese Office Action dated Jul. 30, 2014.

\* cited by examiner

RECHARGEABLE BATTERY HAVING A FUSE WITH AN INSULATING BLOCKING MEMBER

CROSS-REFERENCE TO RELATED APPLICATION

The present application claims priority under 35 U.S.C. §119(e) to U.S. Provisional Application No. 61/344,213, filed on Jun. 11, 2010, and entitled: "Rechargeable Battery," which is incorporated herein by reference in its entirety.

BACKGROUND

1. Field

Embodiments relate to a rechargeable battery.

2. Description of the Related Art

A rechargeable battery is a battery that is rechargeable and dischargeable, unlike a primary battery that cannot be recharged. A rechargeable battery that has a low capacity may be used in a small portable electronic device, e.g., a cellular phone, a laptop computer, and a camcorder, and a large capacity battery may be used for a power supply for, e.g., a motor driving in a hybrid vehicle and the like.

Recently, a high power rechargeable battery that includes a non-aqueous electrolyte having a high energy density has been developed. The high power rechargeable battery may include a large capacity rechargeable battery in which a plurality of rechargeable batteries are coupled with each other in series in order to use it to drive motors of devices requiring large power, e.g., electric vehicles.

A large capacity rechargeable battery may include a plurality of rechargeable batteries that are coupled in series, and the rechargeable battery may have, e.g., cylindrical or angular shapes.

The above information disclosed in this Background section is only for enhancement of understanding of the background of the invention and therefore it may contain information that does not form the prior art that is already known in this country to a person of ordinary skill in the art.

SUMMARY

Embodiments are directed to a rechargeable battery.

The embodiments may be realized by providing a rechargeable battery including an electrode assembly; a terminal; a fuse, the electrode assembly, the terminal, and the fuse being electrically connected to each other; and an insulating blocking member in operative co-operation with the fuse.

The fuse and insulating blocking member may constitute a fuse assembly and the fuse may include a deformable portion that is configured to deform in response to an overcurrent condition in the rechargeable battery and that is configured to trigger and interrupt a current flow upon such deformation.

The insulating blocking member may be configured to maintain the interruption of the current flow when the current flow has been interrupted by the triggering of the fuse.

The rechargeable battery may include a current collector electrically connected between the electrode assembly and the terminal, the fuse including a fuse portion of the current collector.

The blocking member may be disposed in a fuse through hole, the fuse through hole extending through the current collector.

The blocking member may be disposed in a fuse recess in the current collector.

The fuse recess may include at least one slot extending inwardly from a side of the current collector, and the deformable portion of the fuse may be adjacent to the slot.

The fuse recess may be a surface groove extending across a surface of the current collector, and the deformable portion of the fuse may extend from the surface groove to an opposite surface of the current collector.

The rechargeable battery may further include a case accommodating the electrode assembly, and a cap plate coupled to the case.

The terminal may include one of the cap plate or a terminal rod.

The rechargeable battery may further include a lower insulation member between the cap plate and the current collector.

The blocking member may be integrally formed with the lower insulation member.

The blocking member may be a separate piece from the lower insulation member and may include a support plate and a blocking protrusion.

The rechargeable battery may further include a cap assembly, wherein the cap assembly includes the cap plate, a vent member, a sealing cork, and a short circuit member, and the terminal includes a positive terminal and a negative terminal, the negative terminal being electrically connected to the cap plate via a connection plate.

The short circuit member may be configured to deform and short circuit the positive terminal and the negative terminal when an internal pressure of the rechargeable battery exceeds a predetermined pressure.

The embodiments may also be realized by providing a rechargeable battery including an electrode assembly; a terminal; and a fuse assembly, the fuse assembly being electrically connected to the electrode assembly and the terminal and including a current flowing portion, the current flowing portion being disposed on a current collector electrically connected to the electrode assembly and the terminal, a recessed portion, the recessed portion being disposed adjacent to the current flowing portion on the current collector, and an insulating blocking member, the blocking member being in operative co-operation with the recessed portion.

The rechargeable battery may further include a case accommodating the electrode assembly, a cap plate coupled to the case; and a lower insulation member between the cap plate and the current collector.

The insulating blocking member may be integrally formed with the lower insulation member.

The insulating blocking member may be a separate piece from the lower insulation member and includes a support plate and a blocking protrusion.

The current flowing portion may be on a terminal connection portion or an electrode connection portion of the current collector.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
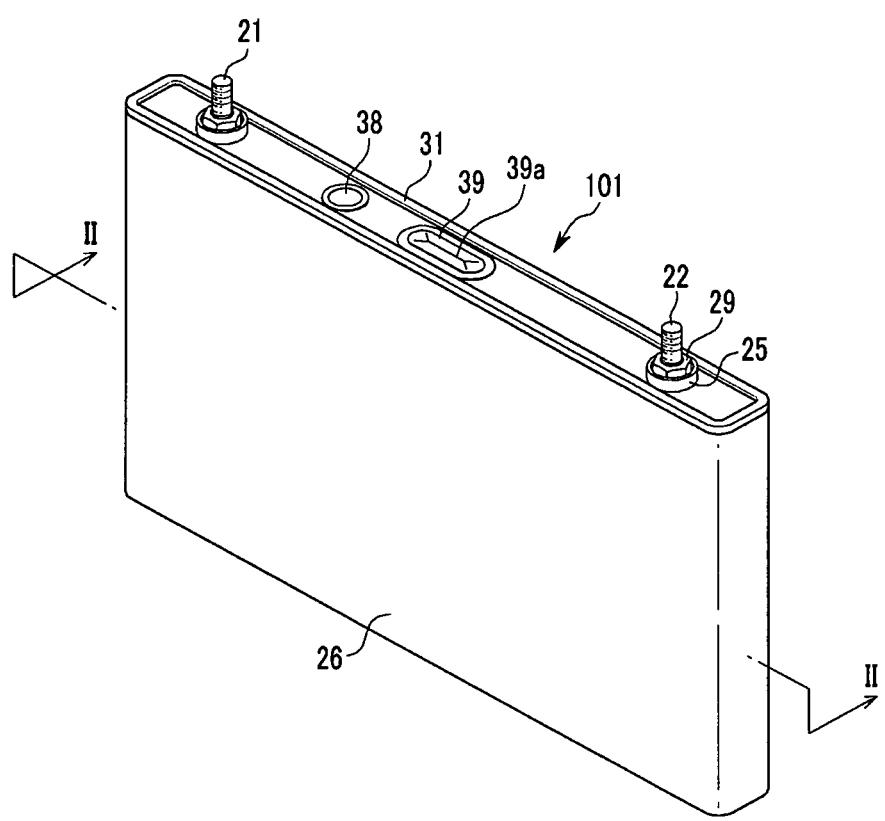
FIG. 1 illustrates a perspective view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
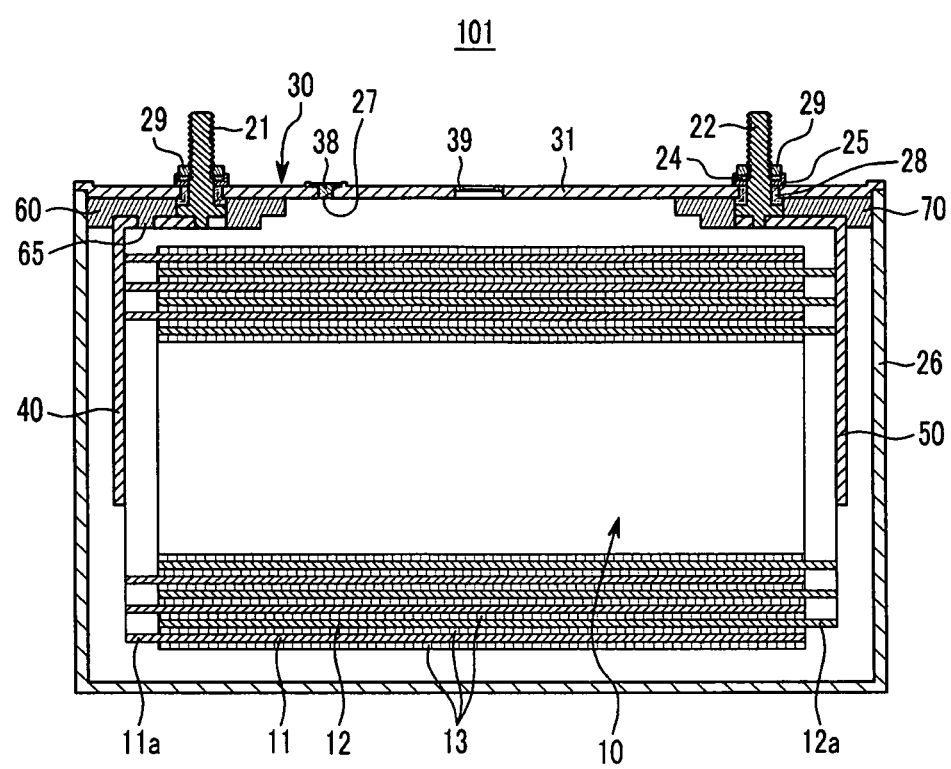
FIG. 2 illustrates a cross-sectional view of FIG. 1 taken along the line II-II.

FIG. 1 illustrates a perspective view of a rechargeable battery according to an embodiment. FIG. 2 illustrates a cross-sectional view of FIG. 1 taken along the line II-II.

Referring to FIGS. 1 and 2, the rechargeable battery 101 according to the present embodiment may include an electrode assembly 10 including a separator 13 interposed between a positive electrode 11 and a negative electrode 12, a case 26 accommodating the electrode assembly 10, and a cap assembly 30 coupled with an opening of the case 26. In an implementation, the electrode assembly 10 may be wound in jelly roll shape.

The rechargeable battery 101 according to the present embodiment will be described with reference to an example of an angular or prismatic lithium ion rechargeable battery. However, the embodiments are not limited thereto, and may be applied to various kinds of batteries, e.g., a lithium polymer battery, cylindrical battery, etc.

The positive electrode 11 and negative electrode 12 may include a coating portion, e.g., a region on which an active material is coated on a current collection body formed of metal foil. The positive electrode 11 and negative electrode 12 may include active material-non-coated portions 11a and 12a, e.g., regions on which the active material is not coated.

The positive active material-non-coated portion 11a may be formed at one end of the positive electrode 11 in a length direction of the positive electrode 11; and the negative active material-non-coated portion 12a may be formed at another end of the negative electrode 12 in a length direction of the negative electrode 12. In an implementation, the positive electrode 11 and negative electrode 12 may be wound with the insulating separator 13 interposed therebetween.

However, the embodiments are not limited thereto; and the electrode assembly 10 may have a structure in which the positive and negative including a plurality of sheets are layered with the separator interposed therebetween.

The case 26 may have a substantially rectangular parallelepiped shape and may include an opening at one end thereof. The cap assembly 30 may include a cap plate 31 that covers the opening of the case 26, a positive terminal 21 that protrudes to the outside of the cap plate 31 and is electrically connected to the positive electrode 11, a negative terminal 22 that protrudes to the outside of the cap plate 31 and is electrically connected to the negative electrode 12, and a vent member 39 including a notch 39a that is configured to burst according to a predetermined internal pressure.

The cap plate 31 may be formed of a thin plate and may include an electrolyte injection inlet 27 for injecting an electrolyte at one side thereof. A sealing cork 38 for sealing the electrolyte injection inlet 27 may be fixed to the cap plate 31.

The terminals 21 and 22 may pass through the cap plate 31. For example, a first gasket 25 at an upper portion of the cap plate 31 and a second gasket 28 at a lower portion of the cap plate 31 may insulate the cap plate 31 and the terminals 21 and 22. In an implementation, the terminals 21 and 22 include a positive electrode 21 and a negative electrode 22.

The terminals 21 and 22 may have a cylindrical shape. Nuts 29 may support the terminals 21 and 22 at upper portions thereof and may be installed on the terminals 21 and 22. For example, a screw thread may be formed on outer circumferences of the terminals 21 and 22 so as to be fastened to the nut 29. Lower portions of the terminals 21 and 22 may include terminal flanges 21a and 22a that support the terminals at lower portions thereof. If the nuts 29 are fastened to the terminals 21 and 22, spaces between the terminals 21 and 22 and the cap plate 31 may be sealed by pressing the first gasket 25 and the second gasket 28 by using the terminal flanges 21a and 22a and the nuts 29.

Lower insulation members 60 and 70 may be included between the terminal flanges 21a and 22a and the cap plate 31 for insulation. The positive terminal flanges 21a and 22a and current collection members 40 and 50 may be fastened to grooves in the lower insulation members 60 and 70 below the cap plate 31. The lower insulation members 60 and 70 may insulate the current collection members 40 and 50 and terminals 21 and 22 from the cap plate 31. The lower insulation members 60 and 70 may be between the terminal flanges 21a and 22a and the cap plate 31 and may be stably fixed.

Figure 3:
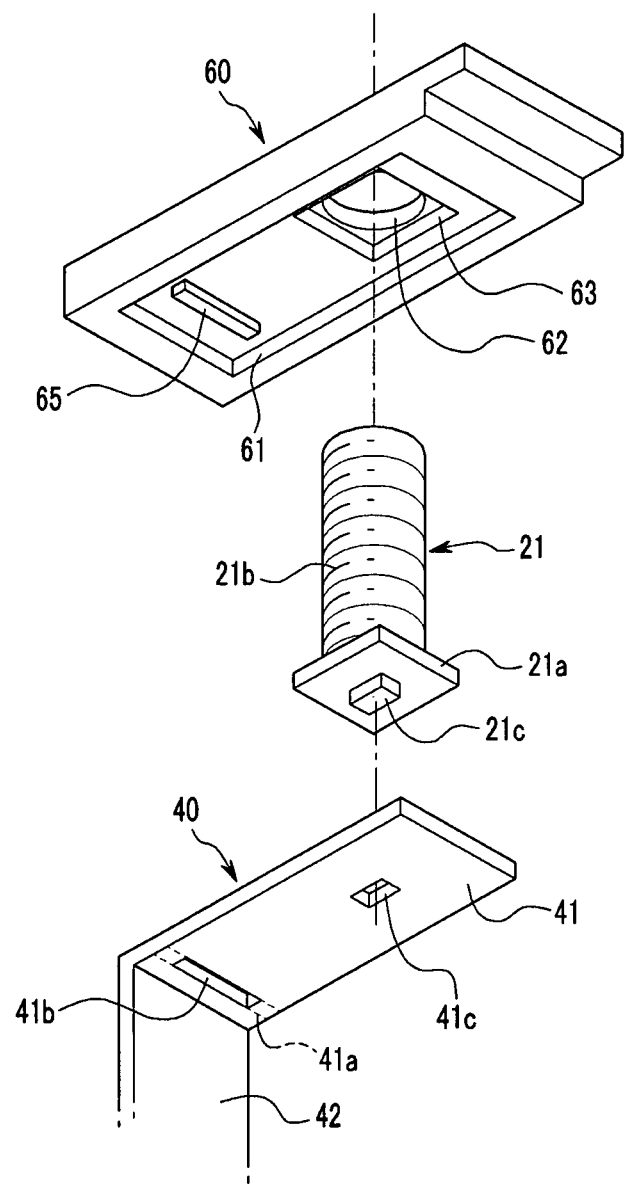
FIG. 3 illustrates a partial exploded perspective view of elements of the rechargeable battery of FIG. 1.

FIG. 3 illustrates a partial exploded perspective view of elements of the rechargeable battery of FIG. 1.

Referring to FIG. 3, the positive terminal 21 may include a terminal rod 21b that protrudes from the terminal flange 21a and has an outer circumferential surface that is threaded. The positive terminal 21 may include a support protrusion 21c that protrudes from a bottom of the terminal flange 21a toward a bottom of the case 26.

The lower insulation member 60 may include a terminal hole 62 into which the terminal rod 21b is inserted, a flange groove 63 into which the terminal flange 21a is inserted, and a connection groove 61 into which the terminal connection portion 41 of the positive current collection member 40 is inserted. The positive current collection member 40 may include a terminal connection portion 41 attached to the positive terminal 21 by, e.g., welding, and an electrode connection portion 42 bent at the terminal connection portion 41 and attached to the electrode assembly 10 by, e.g., welding.

The positive current collection member 40 may include a support hole 41c into which the support protrusion 21c is inserted. The support protrusion 21c and the positive current collection member 40 may be connected by, e.g., welding. The positive current collection member 40 may include a fuse portion or deformable portion 41a that is meltable or deformable in response to an overcurrent condition, e.g., the deformable portion 41a may have a smaller cross-sectional area than other portions of the positive current collection member 40. The deformable portion 41a may be formed in the positive current collection member 40, but the embodiments are not limited thereto. For example, the deformable portions 41a may be connected in series between the electrode assembly 10 and the terminals 21 and 22. When the case 26 serves as the terminal, the deformable portions 41a may be connected in series between the electrode assembly 10 and the case 26.

A fuse through hole 41b may be formed in positive current collection member 40 adjacent to the fuse portion 41a. As described above, the deformable portion 41a may have a smaller cross-sectional area than other portions of the terminal connection portion 41. In response to an overcurrent condition, e.g., when a current exceeds a predetermined current flows through the deformable portion 41a, the deformable portion 41a may melt or deform to thereby interrupt an electrical connection between the electrode assembly 10 and the positive terminal 21.

The blocking member 65 may be inserted into the fuse through hole 41b. The blocking member 65 may be made of a material that has an electrical insulation property. In the present embodiment, the blocking member 65 may be integrally formed with the lower insulation member 60 and may be fixed to the lower insulation member 60, but the embodiments are not limited thereto. For example, the blocking member 65 may be inserted into the fuse through hole 41b.

The blocking member 65 may support the terminal connection portion 41 that is separated after the deformable portion 41a is melted or deformed. After the deformable portion 41a is melted or deformed, even if vibration or impact is transferred from the outside, re-connection of the terminal connection portion 41 may be prevented. For example, if the terminal connection portion 41 is re-connected, an overcurrent condition may re-occur and the rechargeable battery 101 may be ignited or exploded. However, according to the present embodiment, if the blocking member 65 is inserted into the fuse through hole 41b, the blocking member 65 may support the separated melted portions. Thus, it is possible to prevent the melted portion from being re-connected.

Figure 4:
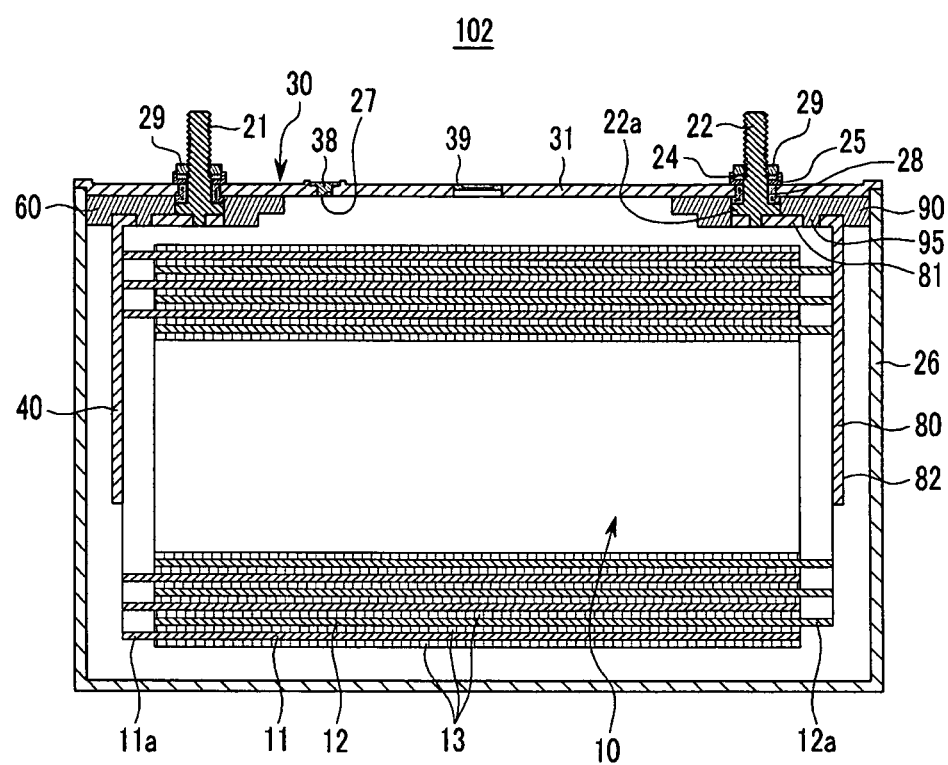
FIG. 4 illustrates a cross-sectional view of a rechargeable battery according to another embodiment.
Figure 5:
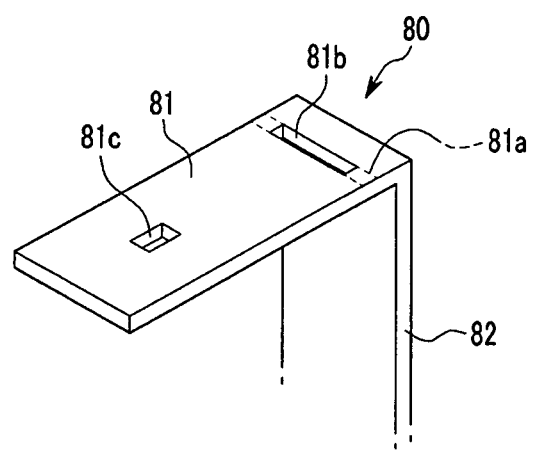
FIG. 5 illustrates a perspective view of a negative current collection member of the rechargeable battery of FIG. 4.

FIG. 4 illustrates a cross-sectional view of a rechargeable battery according to another embodiment. FIG. 5 illustrates a perspective view of a negative current collection member of the rechargeable battery of FIG. 4.

The rechargeable battery 102 according to the present embodiment may be constituted by the same structures as the rechargeable battery according to the previous embodiment, with the exception of structures of the negative current collection member 80 and the lower insulation member 90. Thus, repeated description of the same structures will be omitted.

The negative current collection member 80 according to the present embodiment may include a terminal connection portion 81 attached to the positive terminal 21 by, e.g., welding, as well as an electrode connection portion 82 bent at the terminal connection portion 81 and attached to the electrode assembly 10 by, e.g., welding.

A support hole 81c, into which a support protrusion of a lower portion of the negative terminal 22 may be inserted, and a fuse portion or deformable portion 81a that blocks or interrupts current by deformation or melting in response to an overcurrent condition may be formed in the negative current collection member 80. A fuse through hole 81b may be formed in the terminal connection portion adjacent to the deformable portion 81a. The deformable portion 81a may have a smaller cross-sectional area than other portions of the terminal connection portion 81. In response to an overcurrent condition, the deformable portion 81a may be melted or deformed, thereby interrupting an electrical connection between the electrode assembly 10 and the negative terminal 22.

A blocking member 95 having an electric insulation property may be inserted into the fuse hole 81b; and the blocking member 95 may be fixed to the lower insulation member 90.

As described above, the blocking member 95 may be inserted into the fuse through hole 81b adjacent to the deformable portion 81a and may support the separated deformable portion 81a. Thus, after the deformable portion 81a is melted or deformed, even though vibration or impact may be applied, the current flow may be blocked or interrupted, thereby preventing the rechargeable battery 102 from being overheated.

Figure 6:
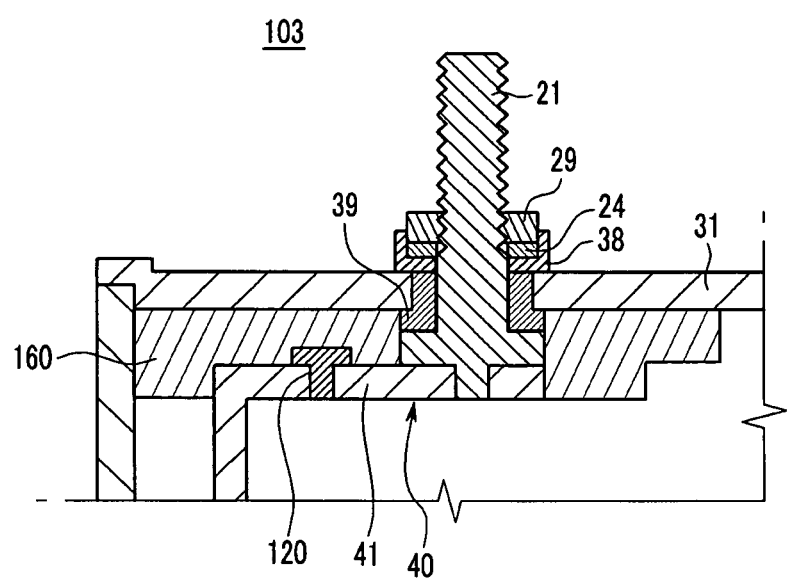
FIG. 6 illustrates a partial cross-sectional view of elements of a rechargeable battery according to yet another embodiment.
Figure 7:
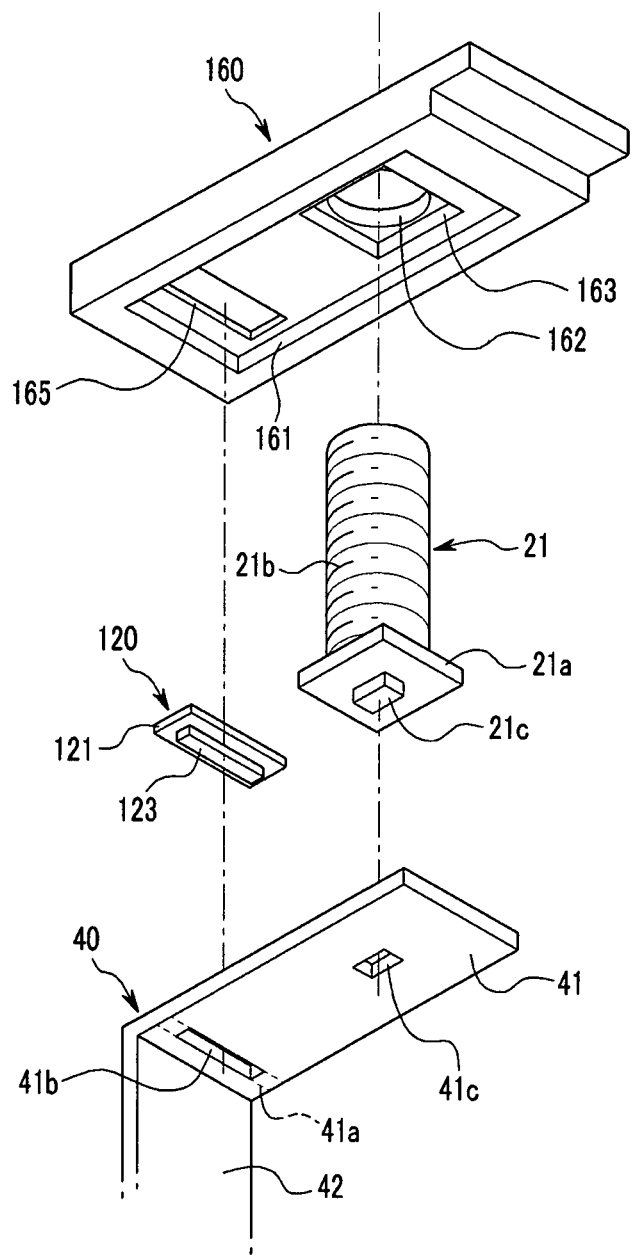
FIG. 7 illustrates a partial exploded perspective view of the elements of the rechargeable battery of FIG. 6.

FIG. 6 illustrates a partial cross-sectional view of elements of a rechargeable battery according to yet another embodiment. FIG. 7 illustrates a partial exploded perspective view of the elements of the rechargeable battery of FIG. 6.

Referring to FIG. 6 and FIG. 7, the rechargeable battery according to the present embodiment may be constituted by the same structures as the rechargeable battery according to the previous embodiment, with the exception of the structures of the blocking member 120 and the lower insulation member 160. Thus, repeated descriptions of the same structures will be omitted.

As shown in FIG. 6 and FIG. 7, a meltable or deformable portion 41a may be formed in the positive current collection member 40. The deformable portion 41a may block or interrupt current flow in response to an overcurrent condition due to a smaller cross-sectional area than other portions of the positive current collection member 40.

A fuse through hole 41b may be formed in the fuse portion 41a; and the blocking member 120, which may have an electric insulation property, may be inserted into the fuse through hole 41b. The blocking member 120 may include a support plate 121 between the terminal connection portion 41 and the lower insulation member 160 as well as a blocking protrusion 123 that protrudes from the support plate 121 and is inserted into the fuse through hole 41b. The support plate 121 may have a larger cross-sectional area than the fuse through hole 41b. Thus, the support plate 121 may not be inserted into the fuse through hole 41b and may contact an upper surface of the terminal connection portion 41.

The lower insulation member 160 may include a terminal hole 162 into which the terminal rod 21b is inserted, a flange groove 163 into which the terminal flange 21a is inserted, a connection groove 161 into which the terminal connection portion 41 of the positive current collection member 40 is inserted, and a blocking groove 165 into which the support plate 121 is inserted. The blocking member 120 may be between an upper portion of the terminal connection portion 41 and the lower insulation member 160.

If the blocking member 120 is inserted into the fuse through hole 41b adjacent to the deformable portion 41a, after the deformable portion 41a is melted or deformed, even if vibration or impact is applied, re-connection of the melted portions may be prevented. Thus, it is possible to prevent the rechargeable battery 103 from being overheated. In addition, a portion of the support plate 121 may be melted by heat generated when the fuse portion 41a is melted and inserted into the fuse through hole 41b. Thus, it is possible to more stably separate the melted portions thereof.

Figure 8:
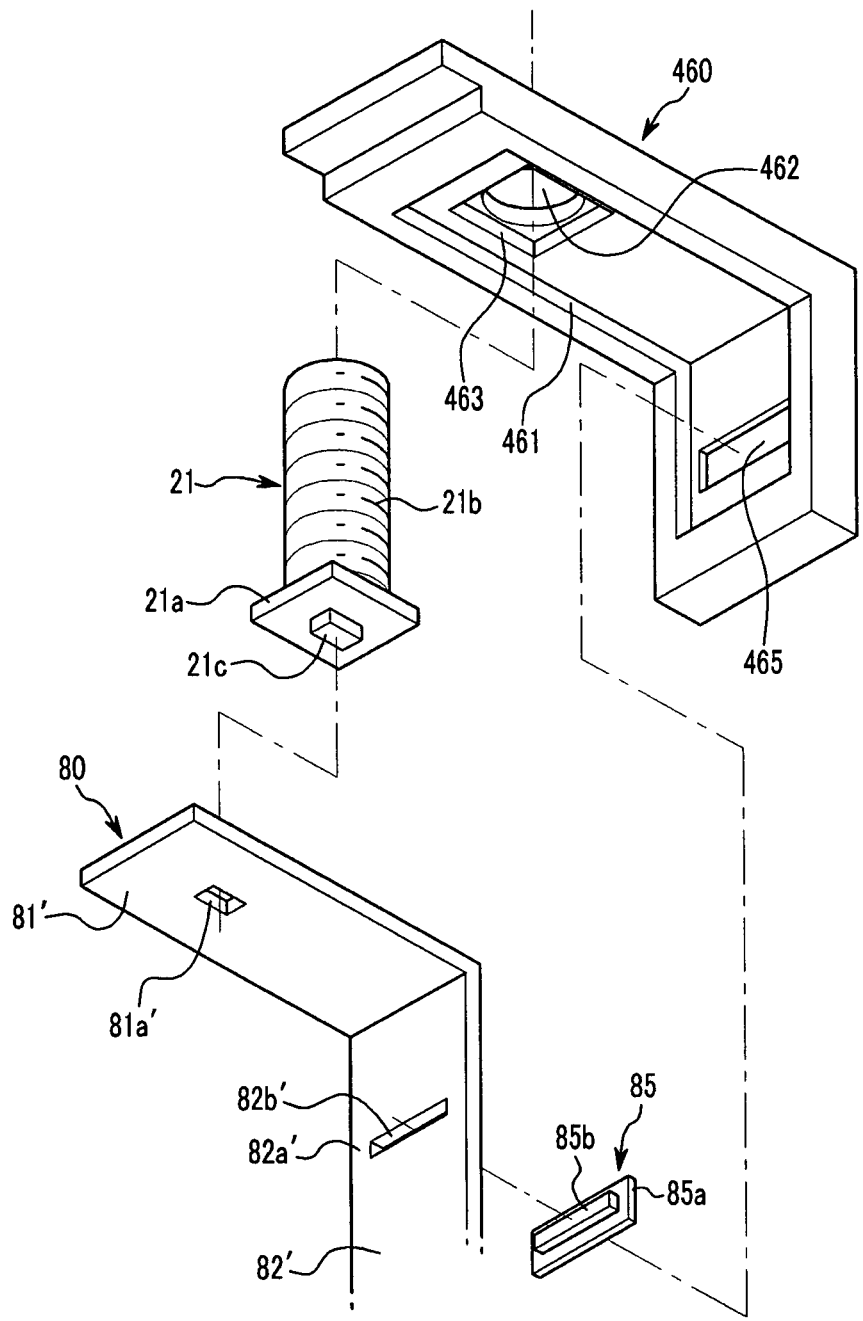
FIG. 8 illustrates a perspective view of a negative current collection member of a rechargeable battery according to still another embodiment.

FIG. 8 illustrates a perspective view of a negative current collection member of a rechargeable battery according to still another embodiment.

Referring to FIG. 8, the rechargeable battery according to the present embodiment may be constituted by the same structures as the rechargeable battery according to the previous embodiment, with the exception of the structure of the negative current collection member 80'. Thus, repeated descriptions of the same structures will be omitted.

As shown in FIG. 8, the negative current collection member 80' according to the present embodiment may include a terminal connection portion 81' attached to the negative terminal 22 by, e.g., welding, as well as an electrode connection portion 82' bent at the terminal connection portion 81' and attached to the electrode assembly 10 by, e.g., welding.

The terminal connection portion 81' may include a support hole 81a' into which a support protrusion of the negative terminal 22 may be inserted. The electrode connection portion 82' may include a fuse portion or deformable portion 82a' that is meltable or deformable in response to an overcurrent condition due to a smaller cross-sectional area than other portions of the electrode connection portion 82'. Thus, current flow may be blocked or interrupted in the electrode connection portion 82'.

A fuse through hole 82b' may be formed in the electrode connection portion 82' adjacent to deformable portion 82a'. The deformable portion 82a' may have a smaller cross-sectional area than other portions of the electrode connection portion 82'. In response to an overcurrent condition, the deformable portion 82a' may melt or deform to interrupt or block an electrical connection between the electrode assembly 10 and the terminal.

A blocking member 85 may be inserted into the fuse through hole 82b'. The blocking member 85 may be made of a material that has an electric insulation property. In an implementation, the blocking member 85 may include a support plate 85a in close contact with the electrode connection portion 82' and a blocking protrusion 85b that protrudes from the support plate 85a and is inserted into the fuse hole 82b'. The blocking member 85 may be positioned closely adjacent to a side of the negative current collection member 80'.

In the present embodiment, if the blocking member 85' inserted into the fuse through hole 82b' adjacent to the deformable portion 82a', the deformable portion 82a' may be melted or deformed, and even if vibration or impact is applied, re-connection of the melted portions thereof may be prevented. Thus, it is possible to prevent the rechargeable battery from being overheated.

Figure 9:
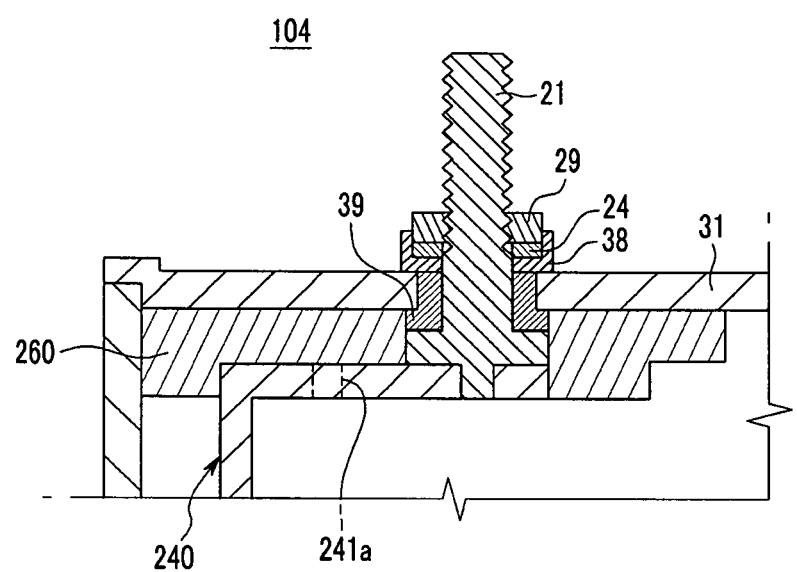
FIG. 9 illustrates a partial cross-sectional view of elements of a rechargeable battery according to still another embodiment.
Figure 10:
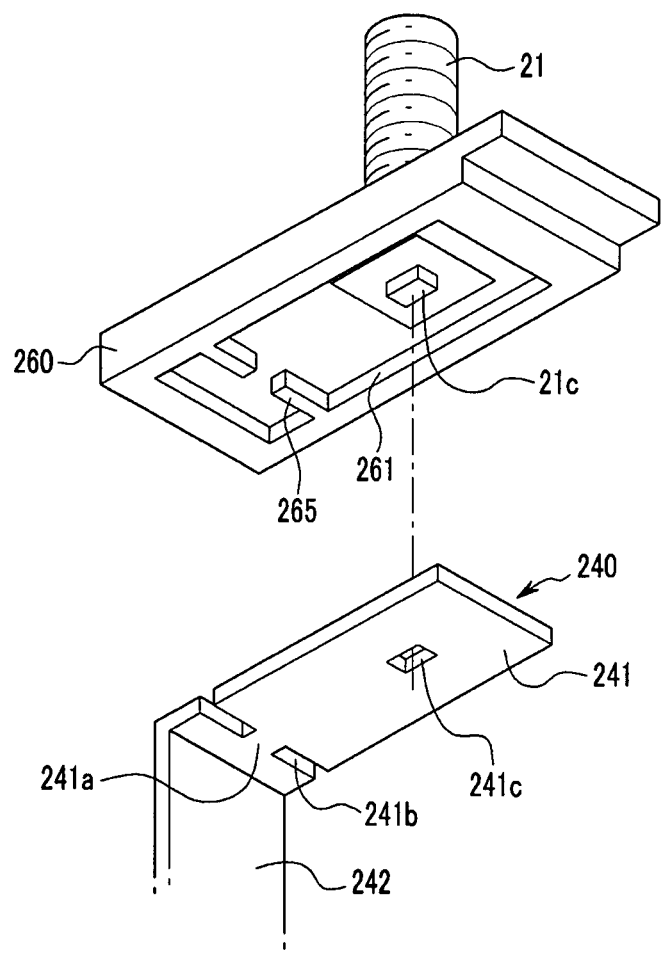
FIG. 10 illustrates a partial exploded perspective view of the elements of the rechargeable battery of FIG. 9.

FIG. 9 illustrates a partial cross-sectional view of elements of a rechargeable battery according to still another embodiment. FIG. 10 illustrates a partial exploded perspective view of the elements of the rechargeable battery of FIG. 9.

The rechargeable battery 104 according to the present embodiment may be constituted by the same structures as the rechargeable battery according to the previous embodiment, with the exception of the structures of the positive current collection member 240 and the lower insulation member 260. Thus, repeated descriptions of the same structures will be omitted.

The positive current collection member 240 according to the present embodiment may include a terminal connection portion 241 attached to a positive terminal 21 by, e.g., welding, and an electrode connection portion 242 bent at the terminal connection portion 241 and attached to an electrode assembly 10 by, e.g., welding.

The positive current collection member 240 may include a support hole 241c into which a support protrusion 21c is inserted. The support protrusion 21c and the positive current collection member 240 may be connected by, e.g., welding. In an implementation, in response to an overcurrent condition, a fuse portion or deformable portion 241a may melt or deform to interrupt current in the positive current collection member 240. A fuse recess 241b may be formed adjacent to the deformable portion 241a; and the deformable portion 241a may have a smaller cross-sectional area than other portions of the terminal connection portion 241. The fuse recess 241b may include a slot extending from at least one side of the terminal connection portion 241 to an inside thereof. In an implementation, the fuse recess 241b may include a pair of slots extending from the sides of the terminal connection portion 241. The deformable portion 241a may be between the fuse recesses 241b or adjacent to the fuse recess 241b. The blocking member 265 may be inserted into the fuse recess 241b; and the blocking member 265 may be made of a material that has an electric insulation property.

The lower insulation member 260 may include a connection groove 261 into which the terminal connection portion 241 is inserted. The blocking member 265 may be fixed to the connection groove 261. The blocking member 265 may extend from at least one side wall of the connection groove 261 to an inside thereof. In an implementation, the blocking member 265 may extend from both side walls of the connection groove 261. For example, the blocking member 265 may correspond to the fuse recess 241b on the terminal connection portion 241.

In the present embodiment, if the blocking member 265 is inserted into the fuse groove 241b adjacent to the deformable portion 241a, the deformable portion 241a is melted or deformed, and vibration or impact is applied, re-connection of the separated portions of the terminal connection portion 241 may be prevented. Thus, it is possible to prevent the rechargeable battery 104 from being overheated.

Figure 11:
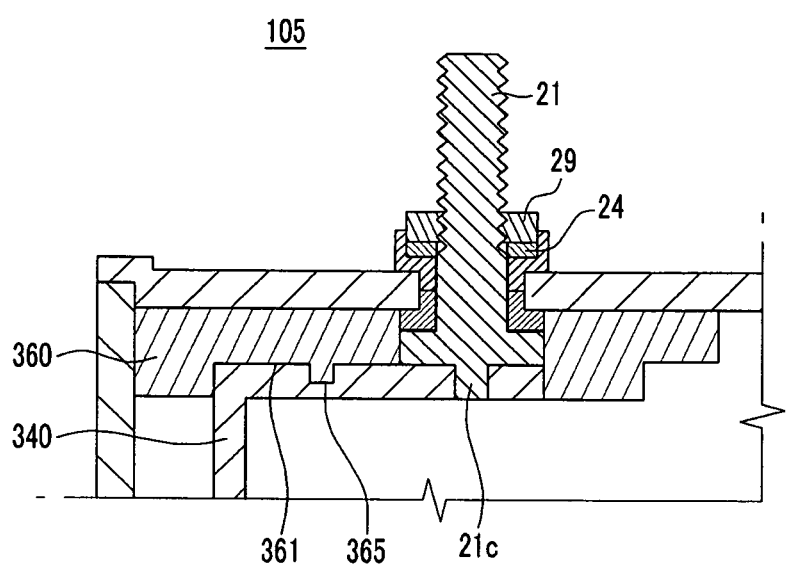
FIG. 11 illustrates a partial cross-sectional view of elements of a rechargeable battery according to still another embodiment.
Figure 12:
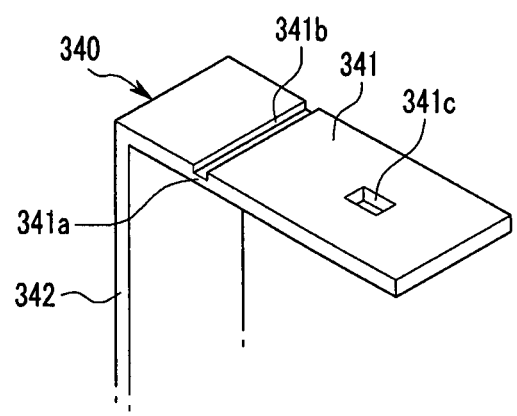
FIG. 12 illustrates a perspective view of a positive current collection member of the rechargeable battery of FIG. 11.

FIG. 11 illustrates a partial cross-sectional view of elements of a rechargeable battery according to still another embodiment. FIG. 12 illustrates a perspective view of a positive current collection member of the rechargeable battery of FIG. 11.

The rechargeable battery 105 according to the present embodiment may be constituted by the same structures as the rechargeable battery according to the previous embodiment, with the exception of the structures of the positive current collection member 340 and the lower insulation member 360. Thus, repeated descriptions of the same structures will be omitted.

A positive current collection member 340 according to the present embodiment may include a terminal connection portion 341 attached to the terminal by, e.g., welding, as well as an electrode connection portion 342 bent at the terminal connection portion 341 and attached to the electrode assembly 10 by, e.g., welding.

The terminal connection portion 341 may include a support hole 341c into which a support protrusion 21c is inserted and a fuse portion or deformable portion 341a that is meltable or deformable to interrupt or block current flow in response to an overcurrent condition. A fuse surface groove 341b may be formed in the terminal connection portion 341 adjacent to the deformable portion 341a; and the deformable portion 341a may have a smaller cross-sectional area than other portions of the terminal connection portion 341. The fuse surface groove 341b may be formed on an upper surface of the terminal connection portion 341 and may extend in a width direction of the terminal connection portion 341. The blocking member 365 may be inserted into the fuse surface groove 341b; and the blocking member 365 may be made of a material that has an electric insulation property.

The blocking member 365 may be integrally formed with the lower insulation member 360, may protrude from the lower insulation member 360, and may extend in a width direction of the lower insulation member 360.

In the present embodiment, if the blocking member 365 is inserted into the fuse surface groove 341b, the deformable portion 341a is melted, and vibration or impact is applied, re-connection of the melted or separated portions of the terminal connection portion 341 may be prevented, e.g., the melted or separated portions may be stably separated.

Figure 13:
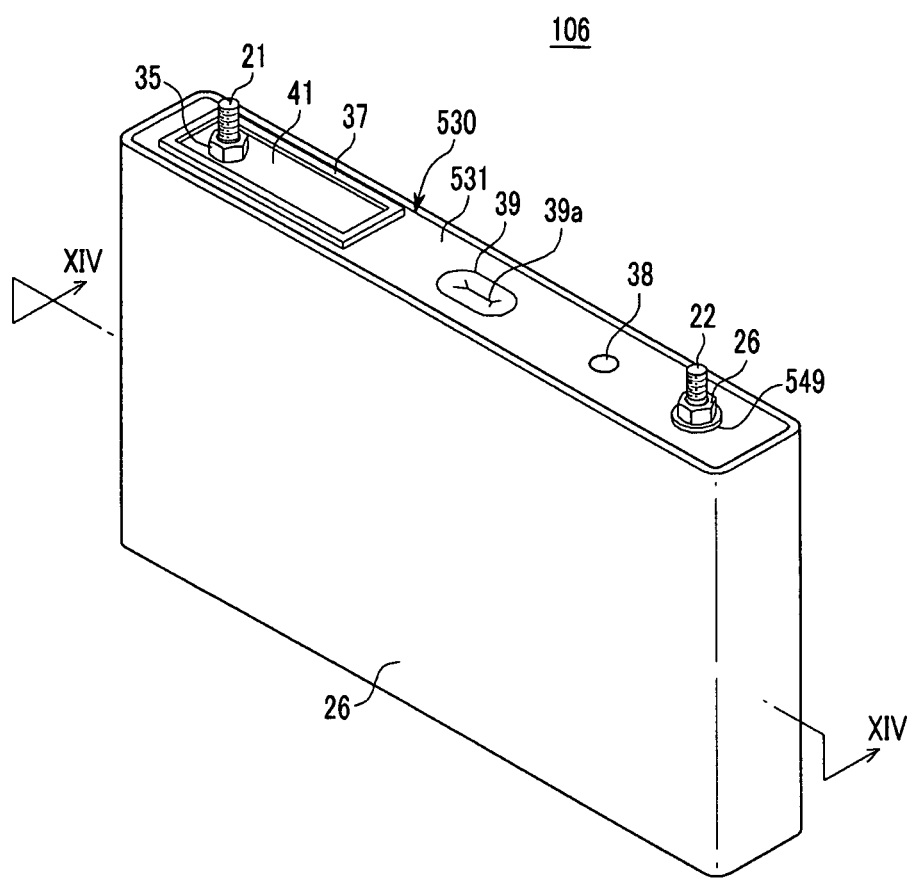
FIG. 13 illustrates a perspective view of a rechargeable battery according to still another embodiment.
Figure 14:
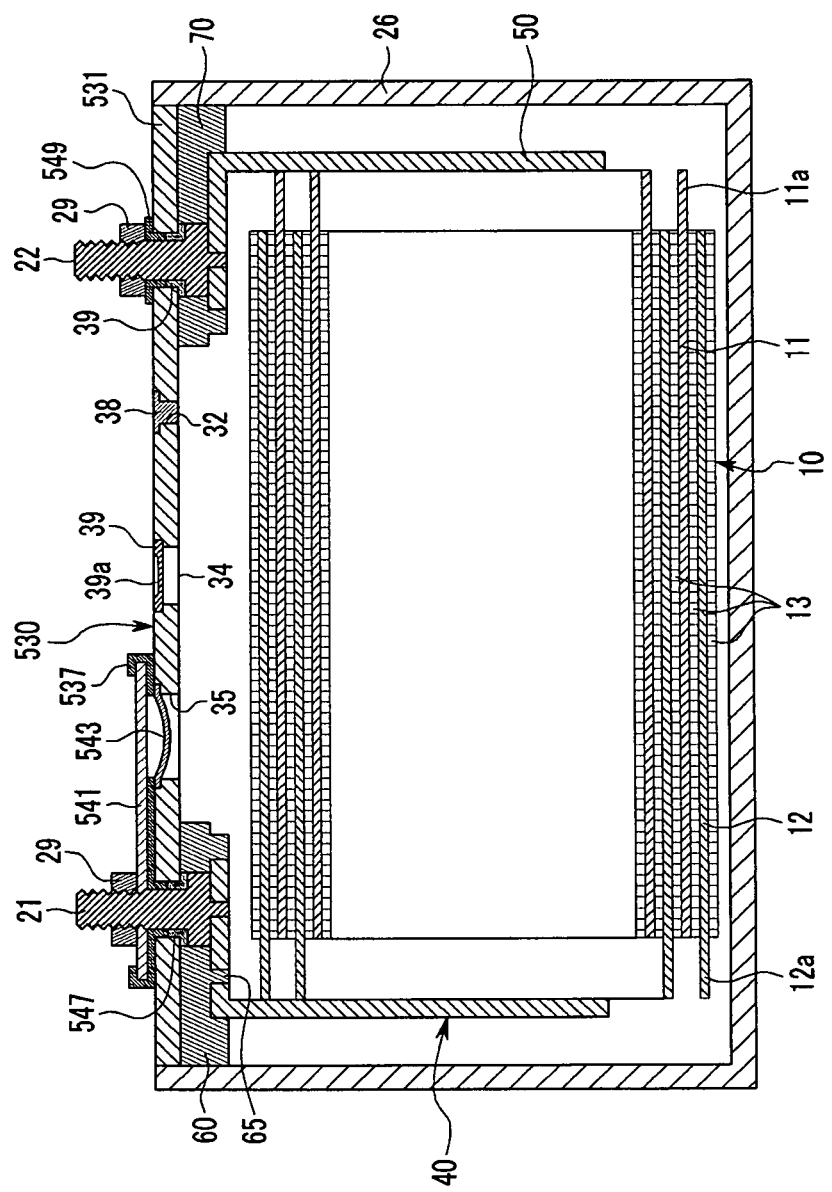
FIG. 14 illustrates a cross-sectional view of FIG. 13 taken along the line XIV-XIV.

FIG. 13 illustrates a perspective view of a rechargeable battery according to still another embodiment. FIG. 14 illustrates a cross-sectional view of FIG. 13 taken along the line XIV-XIV.

Referring to FIGS. 13 and 14, the rechargeable battery 106 according to the present embodiment may include the electrode assembly 10, the case 26 accommodating the electrode assembly 10, and a cap assembly 530 coupled with an opening of the case 26.

The rechargeable battery 104 according to the present embodiment may be constituted by the same structures as the rechargeable battery according to the previous embodiment, with the exception of structures for short-circuiting the positive electrode 11 and the negative electrode 12. Thus, repeated descriptions of the same structures will be omitted.

The cap plate 31 may include a vent member 39, a sealing cork 38 and a short circuit member 543. The short circuit member 543 may be deformed when an internal pressure of the rechargeable battery 106 exceeds a predetermined pressure to electrically connect the positive terminal 21 to the negative terminal 22.

The positive terminal 21 may be electrically connected to the positive electrode 11 via the positive current collection member 40. The negative terminal 22 may be electrically connected to the negative electrode 12 via the negative current collection member 50. The positive current collection member 40 may have the same structures as the positive current collection member according to the previous embodiment, e.g., as shown in FIG. 3, and the deformable portion 41a that is melted or deformed in response to an overcurrent condition may be formed in the positive current collection member 40. The blocking member 65 may be inserted into a fuse through hole 41b adjacent to the deformable portion 41a.

The deformable portion 41a may be disposed above the electrode assembly 10. In the present embodiment, if the deformable portion 41a is disposed above the electrode assembly 10, the deformable portion 41a may not contact the electrolyte. Thus, it is possible to stably prevent the electrolyte from being ignited by heat generated in the deformable portion 41a.

A first short circuit tab 541 electrically connected to the positive terminal 21 may be installed on the cap plate 531 at the positive terminal 21. A cap insulation member 537 that electrically insulates the first short circuit tab 541 and the cap plate 531 from each other may be installed between the first short circuit tab 541 and the cap plate 531.

A connection plate 549 that electrically connects the negative terminal 22 and the cap plate 531 may be installed in the negative terminal 22. The connection plate 549 may be made of a conductive metal and may closely contact the cap plate 531 and the nut 29.

The short circuit member 543 may be deformed when the internal pressure of the rechargeable battery 106 exceeds the predetermined pressure. As a result of the deformation of the short circuit member 543, the first short circuit tab 541 electrically connected to the positive terminal 21 and the second short circuit tab electrically connected to the negative terminal 22 may be short circuited. In the present embodiment, the cap plate 531 electrically connected to the negative terminal 22 may serve as the second short circuit tab.

The short circuit member 543 may be electrically connected to the cap plate 531. The short circuit member 543 may be disposed between the cap insulation member 537 and the cap plate 531 in a short circuit hole 35 in the cap plate 531. The short circuit member 543 may include an arc-shaped curved portion that is convex downward and an inversion plate including a circumferential portion that is fixed to the cap plate 531.

Deformable portions 41a may be connected in series between the short circuit member 543 and the electrode assembly 10.

The first short circuit tab 541 may cover the short circuit hole 35. If the short circuit member 543 is deformed and protrudes upwardly due to excessive internal pressure of the case 26, the first short circuit tab 541 and the cap plate 531 may be electrically connected to each other via the short circuit member 543, thereby causing a short circuit.

If the short circuit occurs, large amounts of current may flow instantaneously or in a short period of time, the deformable portion 41a may be melted, and an electric connection between the positive terminal 21 and the electrode assembly 10 may be prevented.

As described above, according to the embodiment, a large amount of current may flow instantaneously or in a short period of time due to the short circuit. Thus, the deformable portion 41a may be melted or deformed in response to the overcurrent condition that is generated at that time to thereby block the current. If operations of the short circuit member and deformable portion are triggered, operation of the rechargeable battery may be stopped, thereby improving safety.

If the deformable portion 41a is not included, large amounts of current generated by the short circuit may cause the short circuit member 543 to melt. Thus, a short circuit state may not be maintained. If the short circuit is not maintained and the rechargeable battery in which internal temperature and pressure are increased is repetitively charged and discharged, there is a risk of explosion or ignition.

In addition, if a fuse is operated at the time of internal short circuit, a thermal condition where the fuse is operated may be sufficiently increased. Thus, drawbacks associated with resistance and heat may be avoided. For example, at the time of internal short circuit, since a greater amount, e.g., several hundreds times larger, of current may flow as compared to the case of normal operation, if a fuse that is operated at this current is installed, resistance and heat that are generated from the fuse in the case of normal operation may be very small.

In addition, the blocking member 65 may separate the melted portions from each other after melting. Thus, it is possible to prevent a re-connection of the melted portions.

According to the embodiments, in response to an overcurrent condition in the rechargeable battery having a case that is made of conductive materials, e.g., metal, etc., a temperature of the rechargeable battery may increase, triggering the fuse, avoiding the risk of ignition, and improving safety. In addition, even if the internal pressure of the rechargeable battery increases because the electrolyte solution is decomposed in the rechargeable battery due to the overcurrent condition, a risk of explosion of the rechargeable battery may be avoided.

The embodiments provide a rechargeable battery including a safety apparatus having a structure capable of preventing damage in response to an overcurrent condition.

The embodiments provide a rechargeable battery having improved safety.

According to an embodiment, in response to an overcurrent condition, a blocking member may facilitate maintenance of a fuse member in an interrupted state, thereby improving safety of the rechargeable battery.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A rechargeable battery, comprising:
an electrode assembly;
a terminal;
a current collector directly connected to the electrode assembly,
a deformable fuse in the current collector, the fuse including a deformable portion and a recessed portion, the electrode assembly, the terminal, and the fuse being electrically connected to each other;
a lower insulation member; and
an insulating blocking member supportably separating deformed portions of the deformable portion in a triggered condition of the fuse to maintain interruption of current flow in the triggered condition, the insulating blocking member protruding from the lower insulation member and being insertably disposed in the recessed portion of the fuse;
wherein a portion of the terminal passes through the lower insulation member.

2. The rechargeable battery as claimed in claim 1, wherein the fuse and insulating blocking member constitute a fuse assembly and wherein the deformable portion is configured to deform in response to an overcurrent condition in the rechargeable battery.

3. The rechargeable battery as claimed in claim 2, wherein the current collector is electrically connected between the electrode assembly and the terminal, the fuse including a fuse portion of the current collector.

4. The rechargeable battery as claimed in claim 3, wherein the recessed portion is a fuse through hole and the insulating blocking member is disposed in the fuse through hole, the fuse through hole extending through the current collector.

5. The rechargeable battery as claimed in claim 3, wherein the recessed portion is a fuse recess and the insulating blocking member is disposed in the fuse recess in the current collector.

6. The rechargeable battery as claimed in claim 5, wherein:
the fuse recess includes at least one slot extending inwardly from a side of the current collector, and
the deformable portion of the fuse is adjacent to the slot.

7. The rechargeable battery as claimed in claim 5, wherein:
the fuse recess is a surface groove extending across a surface of the current collector, and
the deformable portion of the fuse extends from the surface groove to an opposite surface of the current collector.

8. The rechargeable battery as claimed in claim 3, further comprising:
a case accommodating the electrode assembly, and
a cap plate coupled to the case.

9. The rechargeable battery as claimed in claim 8, wherein the terminal includes one of the cap plate or a terminal rod.

10. The rechargeable battery as claimed in claim 8, wherein the lower insulation member is between the cap plate and the current collector.

11. The rechargeable battery as claimed in claim 10, wherein the insulating blocking member is integrally formed with the lower insulation member.

12. The rechargeable battery as claimed in claim 10, wherein the insulating blocking member is a separate piece from the lower insulation member and includes a support plate and a blocking protrusion.

13. The rechargeable battery as claimed in claim 8, further comprising a cap assembly, wherein:
the cap assembly includes the cap plate, a vent member, a sealing cork, and a short circuit member, and
the terminal includes a positive terminal and a negative terminal, the negative terminal being electrically connected to the cap plate via a connection plate.

14. The rechargeable battery as claimed in claim 13, wherein the short circuit member is configured to deform and short circuit the positive terminal and the negative terminal when an internal pressure of the rechargeable battery exceeds a predetermined pressure.

15. A rechargeable battery, comprising:
an electrode assembly;
a terminal;
a deformable fuse assembly, the fuse assembly being electrically connected to the electrode assembly and the terminal and including:
a current flowing portion, the current flowing portion being disposed on a current collector electrically directly connected to the electrode assembly and the terminal,
a recessed portion, the recessed portion being disposed adjacent to the current flowing portion on the current collector,
a deformable portion adjacent to the recessed portion, and
an insulating blocking member, the blocking member being in operative co-operation with the recessed portion, and supportably separating deformed portions of the deformable portion in a triggered condition of the fuse to maintain interruption of current flow in the triggered condition; and
a lower insulation member, the insulating blocking member being on the lower insulation member, protruding therefrom, and being insertably disposed in the recessed portion, and a portion of the terminal passing through the lower insulation member.

16. The rechargeable battery as claimed in claim 15, further comprising:
a case accommodating the electrode assembly,
a cap plate coupled to the case; and
a lower insulation member between the cap plate and the current collector.

17. The rechargeable battery as claimed in claim 16, wherein the insulating blocking member is integrally formed with the lower insulation member.

18. The rechargeable battery as claimed in claim 16, wherein the insulating blocking member is a separate piece from the lower insulation member and includes a support plate and a blocking protrusion.

19. The rechargeable battery as claimed in claim 15, wherein the current flowing portion is on a terminal connection portion or an electrode connection portion of the current collector.

* * * * *